US008943332B2

(12) United States Patent
Horne et al.

(10) Patent No.: US 8,943,332 B2
(45) Date of Patent: Jan. 27, 2015

(54) AUDIT-LOG INTEGRITY USING REDACTABLE SIGNATURES

(75) Inventors: William Horne, Lawrenceville, NJ (US); Stuart Haber, New York, NY (US); Tomas Sander, New York, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2558 days.

(21) Appl. No.: 11/555,278

(22) Filed: Oct. 31, 2006

(65) Prior Publication Data

US 2008/0104407 A1    May 1, 2008

(51) Int. Cl.
   *G06F 21/00*    (2013.01)
   *G06F 21/64*    (2013.01)
   *G06F 21/33*    (2013.01)

(52) U.S. Cl.
   CPC ............... *G06F 21/64* (2013.01); *G06F 21/33* (2013.01); *G06F 2221/2101* (2013.01)
   USPC ............... 713/193; 713/178; 380/45; 380/46; 707/648

(58) Field of Classification Search
   CPC .... G06F 21/33; G06F 21/64; H04L 2463/121
   USPC ........ 713/178, 156; 380/44–46; 707/102, 648
   See application file for complete search history.

(56) References Cited

U.S. PATENT DOCUMENTS

| | | | |
|---|---|---|---|
| 4,881,264 A * | 11/1989 | Merkle .......................... | 713/177 |
| 7,395,436 B1 | 7/2008 | Nemovicher | |
| 2005/0004899 A1* | 1/2005 | Baldwin et al. ................... | 707/3 |
| 2007/0061579 A1 | 3/2007 | De Mello et al. | |

OTHER PUBLICATIONS

Gassend, B.; et al; "Caches and hash trees for efficient memory integrity verification"; High-Performance Computer Architecture, 2003. HPCA-9 2003. Proceedings. The Ninth International Symposium on DOI: 10.1109/HPCA.2003.1183547 Publication Year: 2003 , pp. 295-306.*

Kawaguchi, N.;et al; "Efficient log authentication for forensic computing";Information Assurance Workshop, 2005. IAW '05. Proceedings from the Sixth Annual IEEE SMC; DOI: 10.1109/IAW. 2005.1495955; Publication Year: 2005 , pp. 215-223.*

Bellare, M., et .al. "Forward Integrity For Secure Audit Logs", Technical report, University of California, San Diego, Nov. 1997.

Casassa, M., et al., "Privacy Enforcement with HP Select Access for Regulatory Compliance", HP Technical Rpt, HPL-2005-10, HP Labs, Hewlett-Packard Company, 2005, 37 Pages.

(Continued)

*Primary Examiner* — Hadi Armouche
*Assistant Examiner* — Angela Holmes

(57) ABSTRACT

A method of establishing the integrity of an audit record set is described. The method comprises receiving a set of audit records and generating a first set of random values wherein each audit record in the set corresponds to at least one value of the first set. The method further comprises generating a second set of values based on an audit record and a corresponding value of the first set for each audit record in the set and generating a summary value based on the second set of values. The method further comprises certifying the summary value to generate an integrity certificate enabling verification of the integrity of the audit record set and storing the audit record set and at least one of the first set of values and the generated digital signature.

21 Claims, 7 Drawing Sheets

(56) References Cited

OTHER PUBLICATIONS

Haber, S., et al., "A Content Integrity Service For Long-Term Digital Archives", IS&T Archiving 2006 Conference, May 23-26, 2006, Ottawa, Canada.

Haber, S., et al., "Efficient signatures schemes supporting redaction, pseudonymization, and data deidentification", in Proc of ACM Symposium on Information, Computer & Communication Security (ASIACCS '08), Tokyo, Japan, Mar. 2008, 11 Pages.

Halevi, S., et al., "Practical and Provably-Secure Commitment Schemes from Collision-Free Heating", CRYPTO '96 Proc. of the 16th Annual International Cryptology Conference on Advanced in Cryptology, Springer-Verlag London, UK, 1996, pp. 201-215.

Miyazaki, K. et al., "Digitally Signed Document Sanitizing Scheme with Disclosure Condition Control", IEICE Trans. Fundamentals, Vo. E88-A, No. 1, Jan. 2005.

Office Action dated Nov. 2, 2011, U.S. Appl. No. 11/854,413, filed Sep. 12, 2007.

Office Action dated Sep. 17, 2010, U.S. Appl. No. 11/854,413, filed Sep. 12, 2007.

Schneier, B, et al., "Cryptographic Support for Secure Logs on Untrusted Machines", Proceedings of the 7th USENIX Security Symposium, pp. 53-62: USENIX Press, 1998.

\* cited by examiner

AUDIT-LOG INTEGRITY USING REDACTABLE SIGNATURES

BACKGROUND

Information technology (IT) systems routinely collect audit and event logs for a variety of applications such as intrusion detection, forensics, fraud detection, network monitoring, and quality control. In the healthcare industry, audit logs play a critical role in tracking patient medical history, drug development, and research. Recently, audit logs have been increasingly important as a means of assuring compliance with financial and legal regulations.

For reliable use of audit logs, the integrity of the data, i.e., the fact that the data has not been corrupted since it entered the system, either accidentally or maliciously, must be maintained. Integrity as used herein does not include the case where the data may have been corrupted before entering the system, for example due to human data entry errors.

For certain applications, strong assurances of data integrity without relying on virtual and physical access control as the primary means of protection are desirable. Cryptographic techniques are particularly well-suited for these situations. For example, records could be signed using public-key signature algorithms for later verification.

However, some cryptographic techniques may not be directly compatible with certain practical requirements, for the following reasons.

Information may be subject to data lifecycle and retention requirements. In some situations, companies may be required to retain data for a specified time period, after which deletion of the data may be desirable. It is a common requirement of privacy laws that a company delete personally identifiable information after it is no longer needed for the purpose for which it was collected. In addition, users may request that their data be removed from a company's system.

Cryptographic techniques typically establish the integrity of an entire set of data in original form. These techniques do not apply to establishing the integrity of any derived subset of the data. Although the derived data may be signed again, there is no correspondence between the integrity of the original and the derived data.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
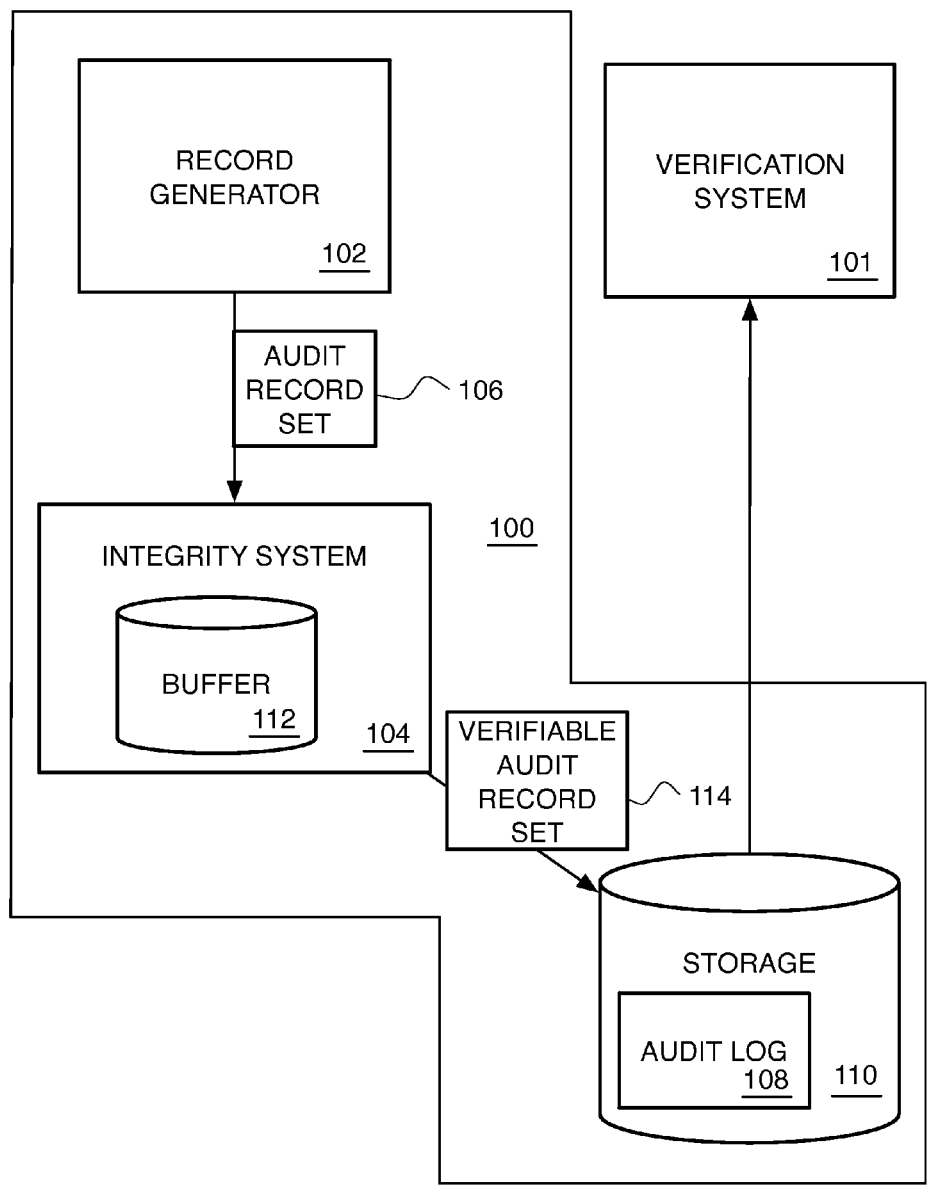
FIG. 1 is a high level block diagram of a portion of a computer system in conjunction with which an audit-log integrity system according to an embodiment may be used to advantage.

FIG. 1 depicts at least a portion of a computer system 100 and a verification system 101 in conjunction with which an embodiment may be used to advantage. Computer system 100 comprises a record generator 102, e.g., an intrusion detection application monitoring access to the computer system and command execution, or any set of instructions able to cause the generation of an audit record or device configured to cause the generation of an audit record, and an integrity system 104 according to an embodiment receiving an audit record set 106 generated by the record generator. Integrity system 104 generates an audit log 108 stored in storage 110 based on received records received from record generator 102. Integrity system 104 comprises a buffer 112 usable in generating audit log 108. In some embodiments, audit log 108 is an append-only database.

In some embodiments, integrity system 104 operates on the same computer system as record generator 102. In some embodiments, integrity system 104 operates remote from the computer system comprising record generator 102. In some embodiments, audit log 108 and integrity system 104 reside on the same computer system 100 and in some other embodiments, the audit log and the integrity system reside on different computer systems. In some embodiments, record generator 102 comprises buffer 112. In some embodiments, integrity system 104 may comprise hardware, software, and/or firmware executable upon and/or integrated as a part of one or more computer systems.

Integrity system 104 stores received audit record set 106 in buffer 112 prior to performing integrity processing on the audit record and generating a "verifiable" audit record set 114 for storage in audit log 108. The use of the term verifiable is meant to describe an audit record set in which the integrity of the audit record set 114 and/or a subset of the audit record set is able to be independently verified, e.g., by verification system 101. In some embodiments, audit record set 106 comprises one or more audit records generated by record generator 102. After generation of a verifiable audit record set 114, Verification system 101 may verify the integrity of the generated verifiable audit record set. In some embodiments, verification system 101 may be a part of computer system 100.

Verification system 101 retrieves a verifiable audit record set 114 from audit log 108 and verifies the integrity of the verifiable audit record set. In some embodiments, verification system 101 verifies the integrity of a redacted version of the verifiable audit record set 114.

Figure 2:
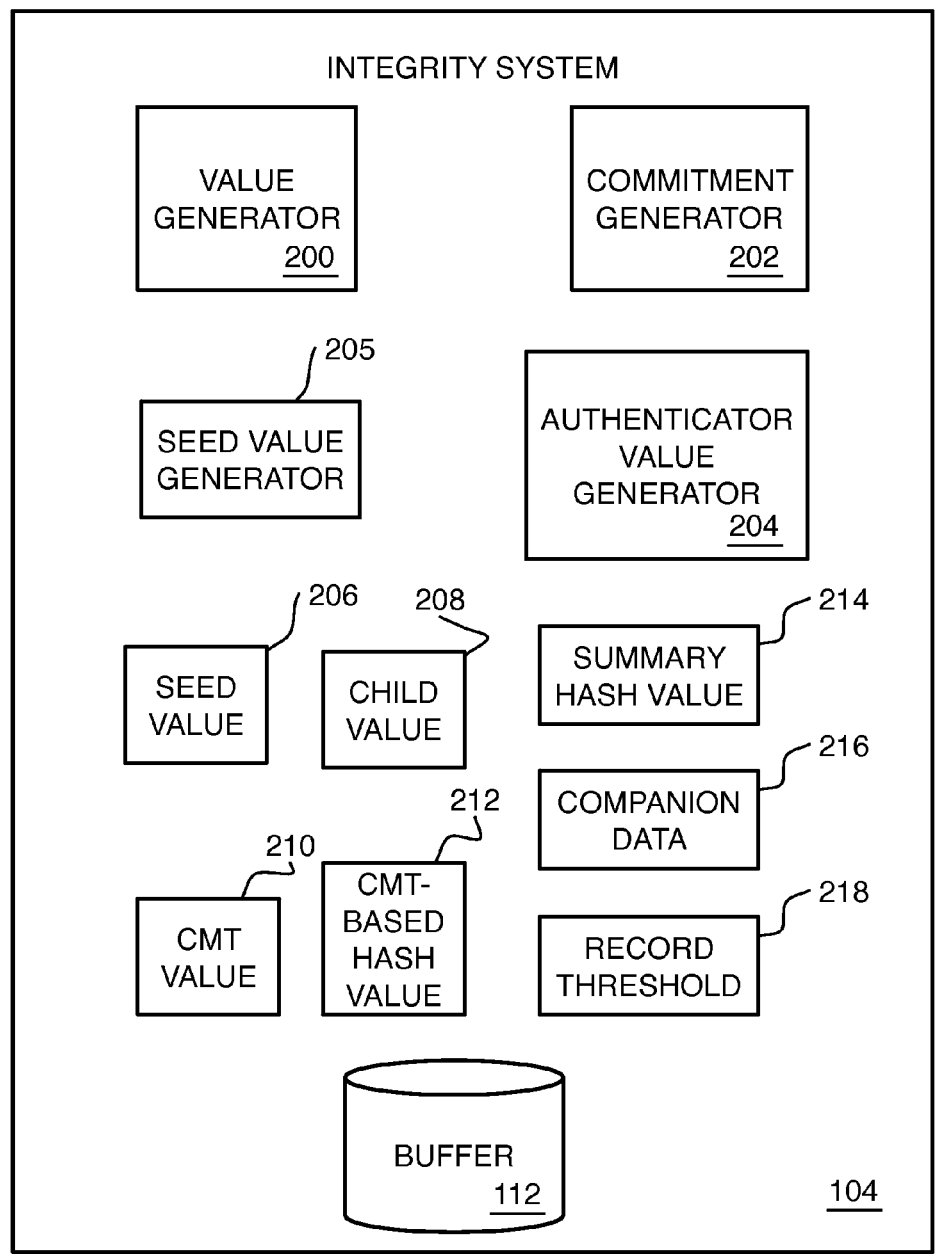
FIG. 2 is a high level functional block diagram of an integrity system according to an embodiment.
Figure 3:
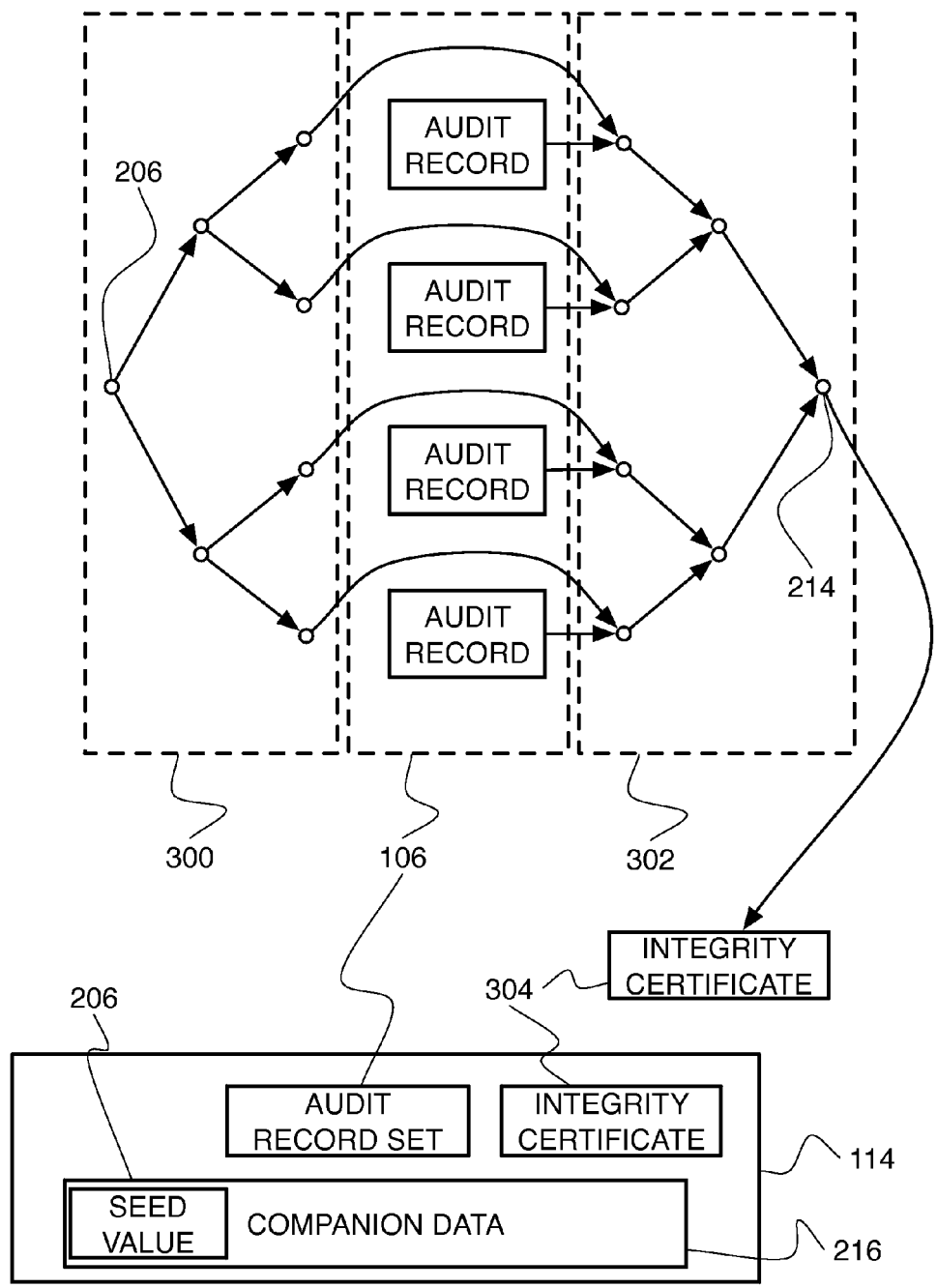
FIG. 3 is a high level block diagram of a verifiable audit record set according to an embodiment.

FIG. 3 depicts a high level block diagram of generation of a verifiable audit record set 114 according to an embodiment. FIG. 3 depicts a received audit record set 106 (dashed outline). Integrity system 104 generates a random or pseudo-random tree 300 (dashed outline), e.g., a GGM binary tree constructed according to Goldreich, Goldwasser, and Micali, "How to construct random functions" Journal of the ACM, 33(4): 792-807, 1986, based on a random or pseudo-random seed value 206 (FIG. 2) as indicated. Random tree 300 comprises a number of leaf nodes corresponding to the number of audit records in audit record set 106. In some embodiments, random tree 300 may comprise greater or lesser number of intermediate nodes between seed value 206 and the leaf nodes of the random tree. In some embodiments, random tree 300 may be a set of randomly generated values.

After generation of random tree 300, integrity system 104 generates a hash tree 302 (dashed outline), e.g., a Merkle hash tree, with leaves generated by application of a commitment scheme to each audit record and the corresponding leaf node of random tree 300. Hash tree 302 comprises a summary hash value 214 (FIG. 2) at the root of the hash tree. In some embodiments, hash tree 302 may comprise greater or lesser number of intermediate nodes between leaf nodes of the hash tree and summary hash value 214. In some embodiments, hash tree 302 may instead be a set or a list of hash values and the hash of the set or list.

Integrity system 104 applies a certifying process to summary hash value 214 to generate an integrity certificate 304 for the audit record set 106. The certifying process applied by integrity system 104 may comprise a signing portion of a digital signature process and/or a certifying portion of a timestamp process, e.g., a time stamping system offered by Surety, LLC of Herndon, Va. Integrity system 104 generates an initial (i.e., unredacted) verifiable audit record set 114 comprising companion data 216 further comprising seed value 206, audit record set 106, and integrity certificate 304. Integrity system 104 stores verifiable audit record set 114 in storage 110. In this manner, a verifiable audit record set may be generated by integrity system 104 based on an audit record set.

In order to verify the integrity of initial verifiable audit record set 114, verification system 101 uses a given seed value from the companion data of the audit record set being verified to construct a new random tree and applies the commitment scheme to each audit record of the audit record set being verified and the corresponding leaf node of the newly constructed random tree to generate a new hash tree. Verification system 101 then verifies the integrity certificate 304 based on application of verification techniques to a newly generated summary hash value of the newly generated hash tree. The verification technique applied depends on whether the integrity certificate resulted from a signing portion of a digital signature process and/or a certifying portion of a time-stamp process.

Figure 4:
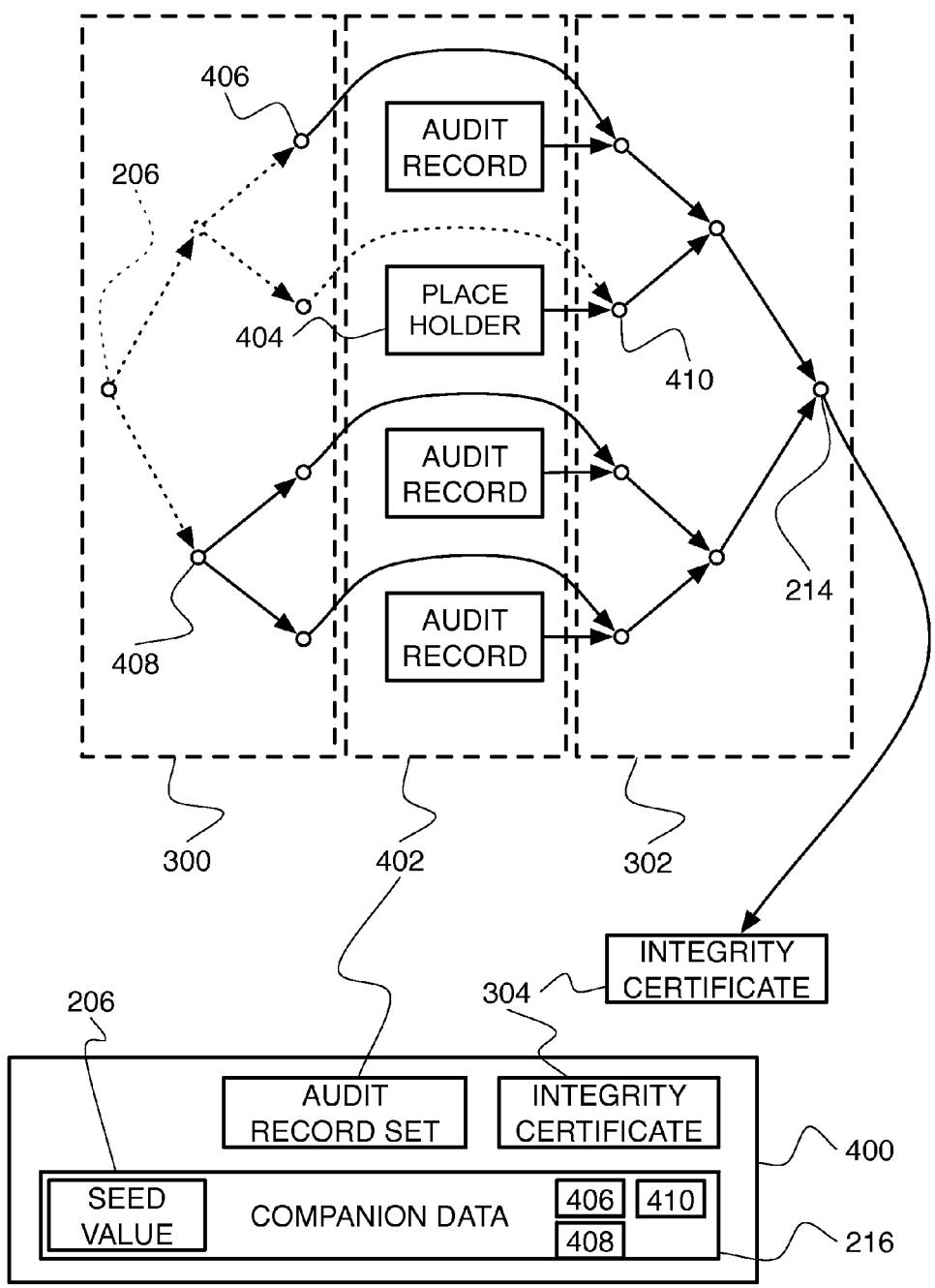
FIG. 4 is a high level block diagram of generation of a verifiable audit record set according to an embodiment.

FIG. 4 depicts a high level block diagram of generation of a verifiable audit record set 400 based on a redacted version 402 of audit record set 106 according to an embodiment. Redacted audit record set 402 comprises audit record set 106 less one of the audit records which has been redacted from the set and replaced with a placeholder symbol 404. Because of the redaction of an audit record from the audit record set, integrity system 104 generates a verifiable audit record set 400 comprising companion data 216, redacted audit record set 402, and integrity certificate 304. Companion data 216 comprises the set of intermediate nodes remaining in tree 300 which generate sub trees whose leaves correspond to the remaining audit records 402, i.e., 406 and 408. Companion data 216 also comprises a set of leaf nodes of hash tree 302 corresponding to the redacted audit record, i.e., 410.

In order to verify the integrity of redacted version 402 of an audit record set in a given verifiable audit record set, verification system 101 uses companion data from the redacted version of the audit record set being verified in conjunction with redacted audit record set 402 to generate a new hash tree and summary hash value. Verification system 101 is able to recreate the relevant portions of hash tree 302 using the redacted audit record set 402 and the companion data of the audit record set being verified. Verification system 101 is then able to verify the integrity certificate 304 as described above.

Figure 5:
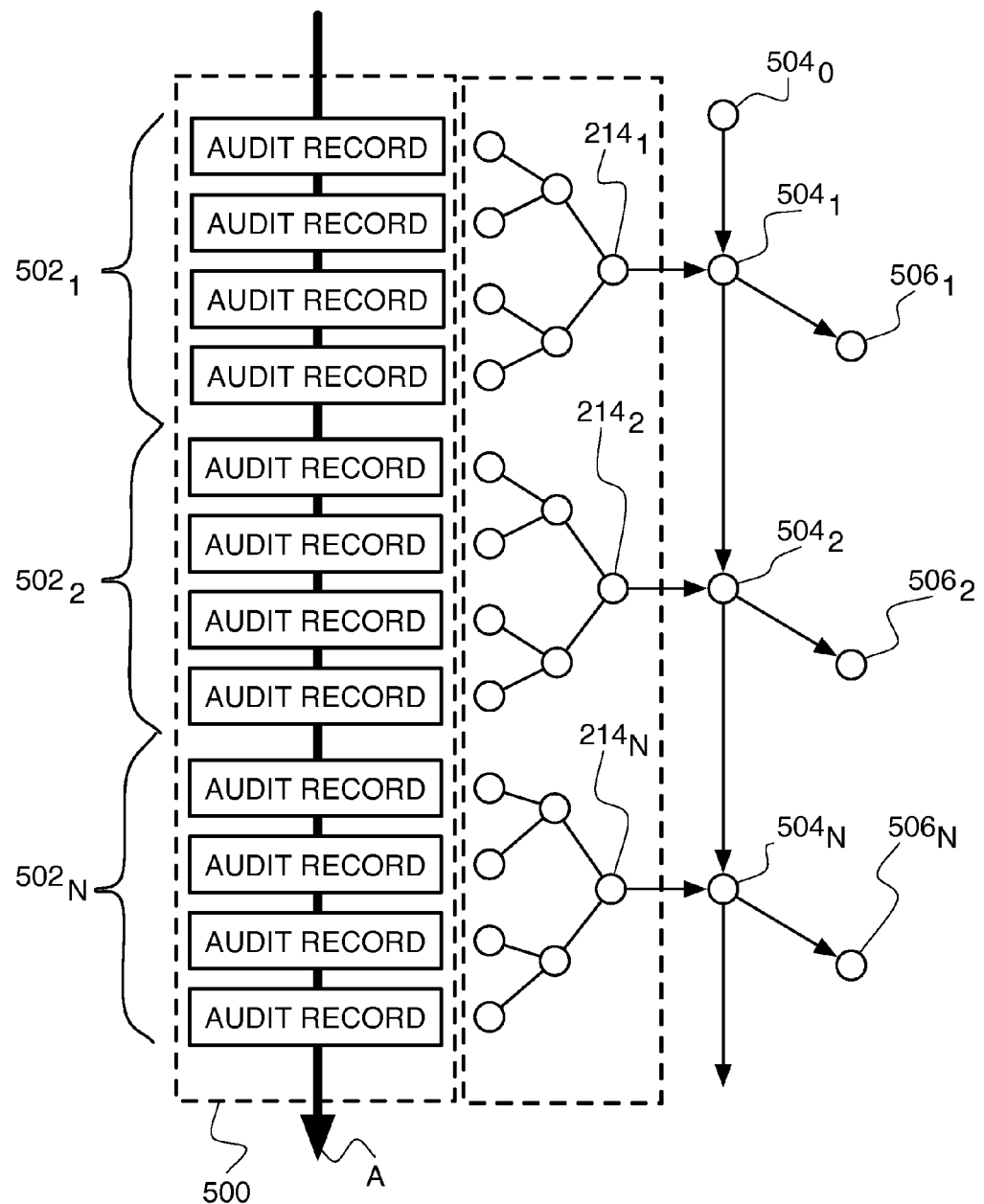
FIG. 5 is an audit record stream according to an embodiment.

FIG. 5 depicts an audit record stream 500 proceeding in time sequence downward along the page (as indicated generally by arrow A). Based on a predetermined record threshold 218, integrity system 104 groups audit records in audit record stream 500 into a series of epochs $502_1, 502_2, 502_N$. Integrity system 104 proceeds to generate a hash tree 302 as described above, resulting in generation of a summary hash value 214 for each epoch 502. For clarity, tree 300 is not depicted in FIG. 5.

Integrity system 104 combines summary hash value 214 with a previous hash value 504 to generate a next hash value 504, e.g., $214_1$ is hashed with $504_0$ to generate $504_1$. Integrity system 104 applies a certifying process to the generated hash value to generate an integrity certificate 506 for epoch $502_1$ and preceding epochs comprised by hash value $504_0$. As depicted an integrity certificate 506 may be generated for each epoch and preceding epochs. Integrity certificate 506 may be used to verify the integrity of a chain of hashed epochs of audit record sets and serves as a certificate of integrity for the entire database at the end of the corresponding epoch.

In this manner, queries submitted to an audit database containing verifiable audit record sets 114 return results accompanied by companion data for the redactable signatures in each epoch of data and, if necessary for verification, additional hash values necessary to verify the hash chain over a requested range of epochs.

Integrity system 104 may be applied to arrays of data such as database tables in which audit records may be stored. Given a two-dimensional array of entries comprising a number of rows and a number of columns, the data in the array is viewed as constituting a single audit record set with the row and column entries comprising the audit records used in ordered fashion, e.g., row-by-row or column-by-column. Random tree 300 is generated corresponding to the entries of each row using a seed value 206 and hash tree 302 is generated in a similar manner to that described above. The resulting summary hash value 214 is certified. In this manner, a verifiable array of data may be generated using integrity system 104.

Figure 6:
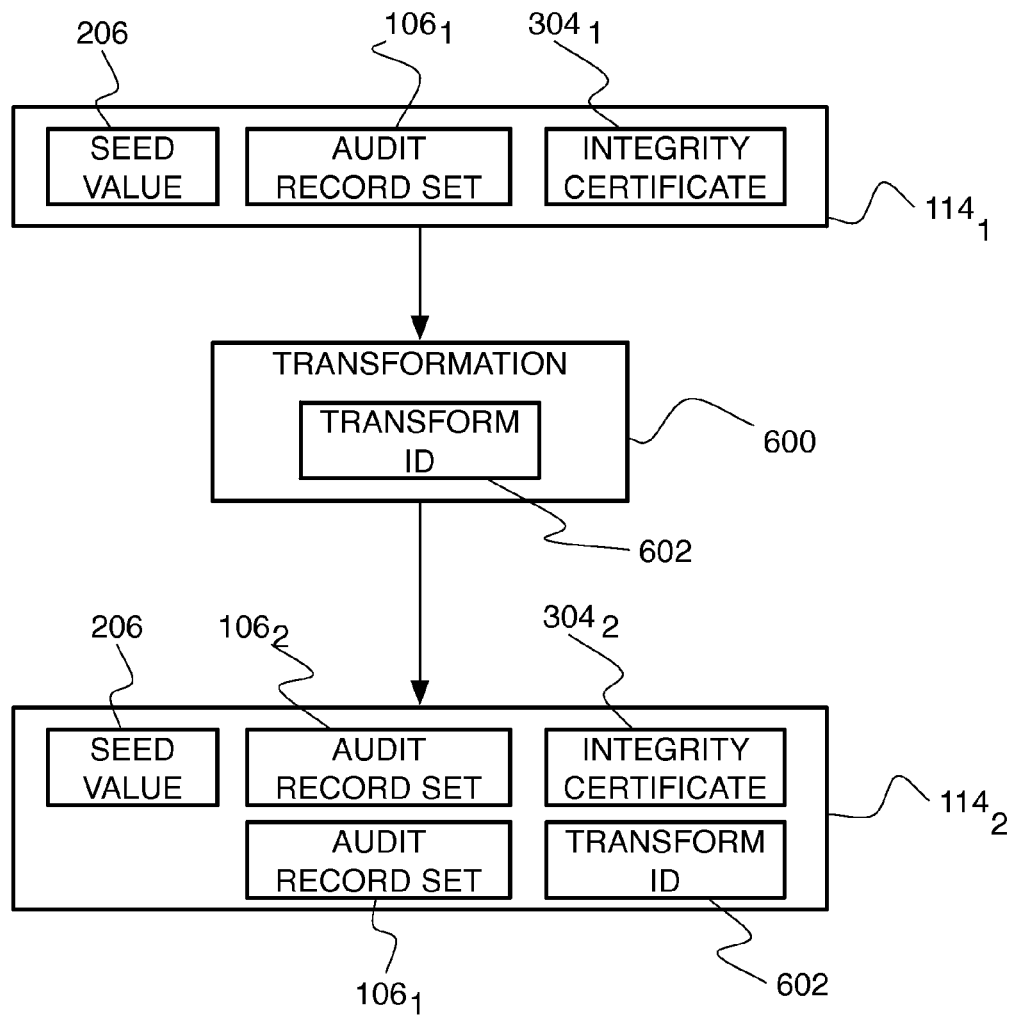
FIG. 6 is a representation of operation of another embodiment.

FIG. 6 depicts operation of an embodiment using a content integrity service (CIS), such as a content integrity service described in "A content integrity service for long-term digital archives," Stuart Haber and Pandurang Kamat, Proceedings of Archiving 2006, pp. 159-164, (Imaging Science and Technology, Springfield, Va.) which is also available as HP Labs Technical Report HPL-2006-54, to generate a time-stamp certificate verifying the integrity of an audit record set after performing a transformation on a verifiable audit record set. Integrity system 104 generates a first verifiable audit record set $114_1$ comprising an integrity certificate 304 based on a first version of the audit record set $106_1$ using a time-stamping digital signature process. A particular transformation 600 with a transform identifier 602 is performed on the first version of the audit record set $106_1$, e.g., a change of format applied to particular audit records. After transformation 600 is performed, integrity system 104 generates a second verifiable audit record set $114_2$ comprising an integrity certificate $304_2$ based on a first version of the audit record set $106_1$, the second version of the audit record set $106_2$, and a representation of transformation 600, i.e., transform ID 602. Verification system 101 uses integrity certificate $304_2$ to verify the integrity of the second version of the audit record set $106_2$.

Figure 7:
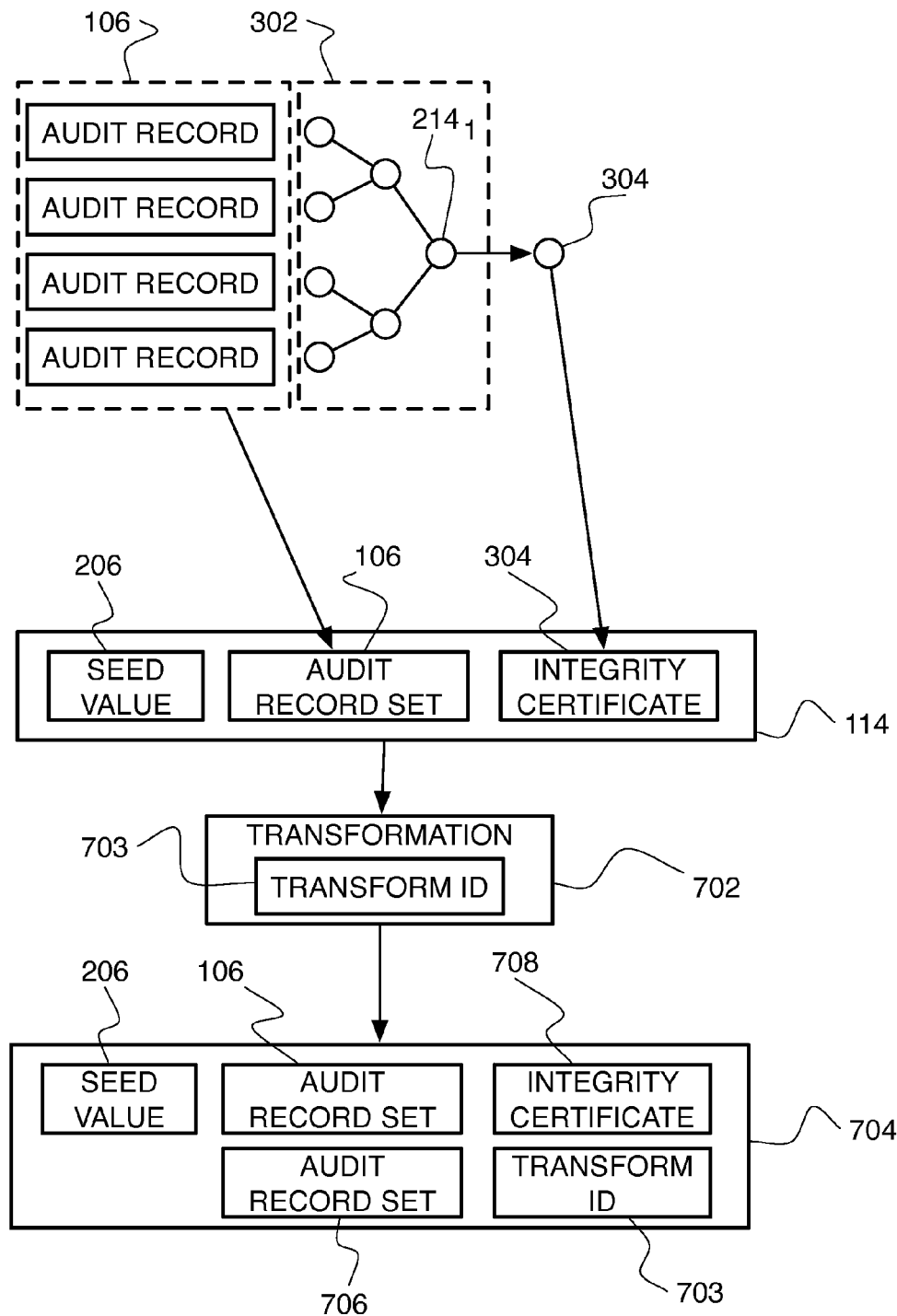
FIG. 7 is a representation of operation of another embodiment.

FIG. 7 depicts operation of an embodiment for parsing unparsed audit records in an audit record set into a set of fields. In order to support more efficient querying of audit records stored in audit log 108, unparsed audit records may be parsed into a set of fields. Integrity system 104 receives and signs a received audit record set 106 using a seed value 206 and hash tree 302 to generate summary hash value $214_1$ which is certified, as described above. Certifying process may comprise, for example, a time-stamping process which generates an integrity certificate 304 based on summary hash value $214_1$.

Integrity system 104 stores the generated verifiable audit record set 114 comprising seed value 206, audit record set 106, and integrity certificate 304 to audit log 108. After generation of verifiable audit record set 114, computer system 100 executes a process to parse the audit records into a set of fields, e.g., a transformation 702 with a transform ID 703 is applied to audit record set 106. As described above, after transformation 702 is performed, integrity system 104 accesses a CIS to generate an integrity certificate 708 verifying the integrity of the audit record set 706 after performing transformation 702 on audit record set 106. Integrity system 104 generates a second verifiable audit record set 704 comprising a parsed version 706 of audit record set 106, seed value 206, an integrity certificate 708, and a representation of transformation 702, i.e., transform ID 703. Verification system 101 uses integrity certificate 708 to verify the integrity of the parsed version of audit record set 106.

In accordance with the parsing approach described above, particular fields, i.e., columns in a database, may not require verification. Fields not requiring verification may be omitted from the above-described signature generation process. Fields not requiring randomization may be hashed without the use of a value from random tree 300 to obtain a leaf for hash tree 302.

FIG. 2 depicts a high level functional block diagram of integrity system 104 comprising a value generator 200, a commitment generator 202, an authenticator value generator 204, and buffer 112. Integrity system 104 also comprises a seed value generator 205 which generates a seed value 206 for use as an input to value generator 200. Value generator 200 receives seed value 206 and generates a set of random child values 208, for example, the value generator may be a random or pseudo-random generator which receives a first value(s) and generates a second value(s). In some embodiments, child values 208 may be pseudo-random child values. Receiving an input random seed value, value generator 200 generates (repeatably) the same child values. In some embodiments, value generator 200 is a deterministic algorithm which receives an input sequence, e.g., one or more seed values 206, and generates an output sequence, e.g., one or more child values 208. In some embodiments, value generator 200 generates more than one child value 208 responsive to receipt of a seed value 206. According to one or more of the above embodiments, value generator 200 is able to generate a random tree, e.g., a binary tree, a GGM tree, etc., of child values 208 based on a seed value 206.

Commitment generator 202 receives an audit record of an audit record set 106 and a child value 208 and generates a commitment (CMT) value 210, i.e., the result of applying the collision-free hash function to the audit record and the child value. In some embodiments, CMT value 210 is a probabilistic commitment regarding the audit record that: conceals information regarding the given audit record, can be confirmed as a valid commitment to the given audit record by application of child value 208 and CMT value 210 to the commitment generator, and cannot be verified as a valid commitment to any other audit record.

In some embodiments, commitment generator 202 is a secure message commitment scheme based on a collision-free hash function. Given a particular message, e.g., an audit record, and a randomly selected value, e.g., seed value 206, a function C is useable to generate CMT value 210=C (audit record, seed value 206). In some embodiments, C may be implemented as a hash function H receiving as input an audit record, a seed value 206, and a predetermined value, e.g., a zero ("0"), indicating input for the CMT value 210 generation.

Authenticator value generator 204, e.g., a Merkle hash tree function or a hash of a list of values, receives two values and generates another value based on a hash of the two received values. In some embodiments, authenticator value generator 204 receives a number of hash values and produces a single hash value. For example, authenticator value generator 204 receives two CMT value(s) 210 and generates a CMT-based hash value 212. Authenticator value generator 204 also receives two generated CMT-based hash values 212 and generates a summary hash value 214. In some embodiments, authenticator value generator 204 generates a CMT-based hash value 212 based on receipt of a single CMT value 210. In some embodiments, authenticator value generator 204 generates a summary hash value 214 based on receipt of a single CMT-based hash value 212. In some embodiments, authenticator value generator 204 generates intermediate hash values based on receipt of pairs of CMT-based hash values 212 and the authenticator value generator generates summary hash value 214 based on hashing two or more intermediate hash values. According to one or more of the above embodiments, authenticator value generator 204 is able to generate a Merkle hash tree with a summary hash value 214 as the root hash value and based on a hash of CMT value(s) 210.

Integrity system 104 generates a verifiable audit record set by combining companion data 216 and audit record set 106. Verification of the audit record set is performed as follows: Verification system 101 system 104 is able to perform verification of unredacted verifiable audit record set 114 by: computing a set of child value(s) 208, based on seed value 206 from companion data 216, each corresponding to an audit record; computing the Merkle hash tree based on the child value(s) 208 and the audit records from the verifiable audit record set (i.e., computing CMT value(s) 210 using commitment generator 202 and a particular audit record of the verifiable audit record set and the computed child value 208 corresponding to the particular audit record to compute a CMT value 210; computing CMT-based hash value(s) 212 using commitment generator 202 and the computed CMT value(s) 210; computing the summary hash value 214 using commitment generator and the computed CMT-based hash value(s) 212); and checking the companion data 216 using the generated summary hash value.

Integrity system 104 stores received audit records from record generator 102 in buffer 112. After the number of audit records received from generator 102 meets a predetermined record threshold 218, integrity system 104 generates the verifiable audit record set 114 using seed value 206. In this manner, integrity system 104 generates verifiable audit record set(s) 114 based on a predetermined number of audit records. In some embodiments, record threshold 218 specifies a time period of received audit record set 106 which is used to generate verifiable audit record set 114.

In some embodiments, a series of verifiable audit record sets may be linked together by combining the corresponding summary hash values 214 of each verifiable audit record set in a hash chain, as depicted in FIG. 5.

Integrity system 104 and verification system 101 may be implemented on one or more processing systems such as a laptop, a desktop computer, a workstation, a server, a server farm, a data center, etc. In some embodiments, integrity system 104 and verification system 101 may comprise a set of executable instructions stored in a memory and/or computer-readable medium.

End-to-end integrity assurance supported by some of the above embodiments enables certifying of arriving audit records on arrival at integrity system 104 followed by later parsing of the audit records while providing links to proof of integrity when the data first entered the system.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of establishing the integrity of an audit record set, comprising:
receiving a set of audit records;
generating a first set of random values wherein each audit record in the audit record set corresponds to at least one of the first set of values;
generating a second set of values based on an audit record and a corresponding value of the first set of values for each audit record in the audit record set;
generating a summary value based on the second set of values;
certifying the summary value to generate an integrity certificate enabling verification of the integrity of the audit record set; and
storing the audit record set and at least one of the first set of values and the integrity certificate.

2. The method of claim 1, wherein the certifying comprises applying at least a portion of at least one of: a digital signature process and a time-stamp process.

3. The method of claim 1, wherein the generating a first set of values comprises constructing a binary tree comprising leaf nodes corresponding to audit records of the audit record set.

4. The method of claim 1, wherein the generating a first set of values comprises constructing a GGM tree.

5. The method of claim 1, wherein the generating a second set of values comprises generating the second set of values using a commitment scheme based on a value from the first set of values and an audit record.

6. The method of claim 1, wherein the generating a summary value comprises generating a summary value based on at least one value of the first set of values and an audit record of the audit record set corresponding to the at least one value of the first set of values.

7. The method of claim 1, wherein the generating the summary value comprises generating a Merkle hash tree.

8. The method of claim 1, wherein the receiving a set of audit records comprises
determining the audit record set based on a predetermined record threshold.

9. The method of claim 1, wherein the generating a first set of values comprises at least one of randomly or pseudo-randomly generating the first set of values based on a seed value.

10. The method of claim 1, further comprising:
receiving a second set of audit records;
generating a third set of values in a deterministic manner wherein each audit record in the second audit record set corresponds to at least one of the third value set;
generating a fourth set of values based on an audit record of the second audit record set and a corresponding value of the third value set for each audit record in the second audit record set;
generating a second summary value based on the fourth set of values;
certifying a combination of the second summary value and the certified first root value to generate a second integrity certificate verifying the integrity of the first and second audit record sets; and
storing the second audit record set and at least one of the values of the third value set and the generated second digital signature.

11. A verifiable audit record set comprising at least a subset of an audit record set, a first set of random values, and an integrity certificate generated according to the method of claim 1.

12. A method of establishing audit record integrity for a redacted audit record set based on a verifiable audit record set, comprising:
redacting an audit record from a verifiable audit record set comprising an integrity certificate and a first set of values, wherein each audit record in the audit record set corresponds to at least one of the first set of values;
determining a first set of values corresponding to the remaining audit records after redaction of an audit record;
determining a second set of values remaining corresponding to the redacted audit record; and
storing the remaining first set of values and second set of values with the redacted audit record set and a integrity certificate of the verifiable audit record set.

13. The method of claim 12, further comprising:
replacing the redacted audit record in the audit record set with a placeholder symbol.

14. The method of claim 12, wherein the determining a first set of values remaining comprises determining a first set of values wherein each value is an intermediate node corresponding to at least one remaining audit record.

15. The method of claim 12, wherein the determining a second set of values remaining comprises determining a second set of values wherein each value corresponds to at least one redacted audit record.

16. The method of claim 15, wherein the determining a second set of values further comprises determining a second set of values wherein each value corresponds to a lowest level leaf node corresponding to one or more redacted audit records.

17. A method of verifying the integrity of a set of redacted audit records using a first set of values corresponding to a binary tree generated based on a seed value, a second set of values each generated based on a combination of at least one value from the first set of values and at least one audit record from the redacted audit record set, and an integrity certificate generated based on a verifiable audit record set from which the redacted audit record set originated, comprising:
generating a third set of values, based on the first set of values, wherein each audit record corresponds to at least one value of the third set of values;
generating a fourth set of values based on: (a) an audit record and a corresponding value from the third set of values and (b) the second set of values, for each audit record in the redacted audit record set;
generating a summary value based on the generated fourth set of values; and
generating a signal based on a result of applying a verification process to the generated summary value and the integrity certificate.

18. The method of claim 17, wherein the verification process comprises applying at least a portion of at least one of: a digital signature process and a Lime-stamp process.

19. A non-transitory memory or a computer-readable medium storing instructions which, when executed by a processor, cause the processor to perform the method of claim 1.

20. A non-transitory memory or a computer-readable medium storing instructions which, when executed by a processor, cause the processor to perform the method of claim 17.

21. A system for establishing the integrity of an audit record set, comprising:
- a value generator arranged to generate a first value set comprising at least one of random and pseudo-random values corresponding to at least one audit record in the audit record set;
- a commitment generator communicatively coupled with the value generator and arranged to generate a second value set wherein each value of the second value set is based on applying a commitment scheme to an audit record of the audit record set and a value of the first value set corresponding to the audit record; and
- an authenticator value generator communicatively coupled with the commitment generator and arranged to generate a third value set based on the second value set and wherein the third value set comprises a summary value based on the second value set.

* * * * *

UNITED STATES PATENT AND TRADEMARK OFFICE
CERTIFICATE OF CORRECTION

| | | |
|---|---|---|
| PATENT NO. | : 8,943,332 B2 | Page 1 of 1 |
| APPLICATION NO. | : 11/555278 | |
| DATED | : January 27, 2015 | |
| INVENTOR(S) | : William Horne et al. | |

It is certified that error appears in the above-identified patent and that said Letters Patent is hereby corrected as shown below:

In the claims,

In column 8, line 64, in Claim 18, delete "Lime" and insert -- time --, therefor.

Signed and Sealed this
Sixteenth Day of February, 2016

Michelle K. Lee
*Director of the United States Patent and Trademark Office*